United States Patent
Orth et al.

[15] 3,697,919
[45] Oct. 10, 1972

[54] SEMICONDUCTOR PRESSURE TRANSDUCER STRUCTURE

[72] Inventors: Edward D. Orth, Boxford; Alvan A. Kessel, Wakefield, both of Mass.

[73] Assignee: General Electric Company

[22] Filed: Aug. 3, 1971

[21] Appl. No.: 168,549

[52] U.S. Cl. .............................. 338/42, 73/398 AR
[51] Int. Cl. ........................................ H01c 13/00
[58] Field of Search ...................... 338/2, 3, 4, 5, 42; 73/88.5 SD, 398 AR; 317/235 M

[56] References Cited

UNITED STATES PATENTS

| | | | |
|---|---|---|---|
| 3,149,488 | 9/1964 | Castro | 338/5 X |
| 3,204,463 | 9/1965 | Taber | 73/398 AR |
| 3,237,138 | 2/1966 | Kooiman et al. | 73/88.5 SD |
| 3,341,794 | 9/1967 | Stedman | 73/398 AR |

*Primary Examiner*—C. L. Albritton
*Attorney*—William S. Wolfe et al.

[57] ABSTRACT

The pressure-sensitive diaphragm assembly is mounted in and sealed to the transducer housing by a wedge-shaped seal which is continuously forced into a wedging and sealing position by pressure of fluid in the transducer housing.

6 Claims, 2 Drawing Figures

PATENTED OCT 10 1972  3,697,919

INVENTORS
EDWARD D. ORTH
ALVAN A. KESSEL
BY
NSWolfe
ATTORNEY

SEMICONDUCTOR PRESSURE TRANSDUCER STRUCTURE

BACKGROUND OF THE INVENTION

The present invention relates to pressure transducers of the type utilizing a flexible semiconductor diaphragm as a pressure sensor. More particularly, it relates to an improved mounting and sealing arrangement for the diaphragm assembly adapted to withstand high operating pressures without leakage of the fluid under pressure.

Pressure-sensitive diaphragms of the piezoresistive type formed of semiconductor materials such as silicon have been developed which have the advantages of high sensitivity, linearity and small size. Attempts to use such devices as pressure sensors in pressure transducers for industrial use have encountered many design problems. The transducers must be capable of measuring and withstanding high pressures, e.g. up to 10,000 psi. These high operating pressures require rugged metal housings, and problems arise because of differences of mismatch in the coefficients of expansion of the housing, the silicon diaphragm, and the intermediate supporting and sealing materials. In order to prevent thermal stresses on the pressure-sensitive diaphragm and resulting measurement error due to expansion mismatch between the diaphragm and its support, the diaphragm has been integrally bonded to an elongated support formed of glass. A glass is used which has an expansion coefficient similar to silicon. Such a construction is disclosed and claimed in a copending application of Edward D. Orth and Alexander J. Yerman, Ser. No. 168,278 filed Aug. 2, 1971 and assigned to the same assignee as the present invention. With this construction, a seal must then be provided which will accommodate the expansion mismatch between the glass support and the transducer housing which is metal, usually stainless steel. A tight seal for all operating temperature conditions is required to prevent leakage of fluid under pressure. In some applications, the fluid around the pressure-sensitive diaphragm is a liquid, such as oil, in a hermetically sealed chamber used to isolate the diaphragm from corrosive fluids being measured. In such applications, a tight seal is extremely important to prevent loss of the fluid by leakage and resulting measurement error due to faulty pressure transmission to the pressure sensor.

Accordingly, it is an object of the present invention to provide a pressure transducer having an improved construction for mounting and sealing to the housing the pressure-sensitive diaphragm assembly.

Another object of the invention is to provide an improved seal for a pressure transducer of the type in which the pressure-sensitive diaphragm is disposed in a hermetically sealed fluid chamber to which pressure to be measured is transmitted through an isolating diaphragm.

Further objects and advantages of the invention will become apparent as the following description proceeds.

SUMMARY OF THE INVENTION

Briefly, in accordance with the invention, the pressure transducer housing comprises two mating parts. A first part has interior walls forming a fluid chamber and a second part has tapered interior walls forming a mounting socket for an elongated support forming a part of the diaphragm assembly. A wedge-shaped seal cast into the mounting socket properly positions in the fluid chamber the diaphragm assembly. The fluid chamber is filled with liquid and closed by an isolating diaphragm to which a pressure to be measured is applied. Pressure in the fluid chamber wedges the seal into sealing engagement with the diaphragm support and the tapered socket walls.

For a better understanding of the invention, reference should be made to the following detailed description taken in connection with the accompanying drawings.

DETAILED DESCRIPTION

Figure 1:
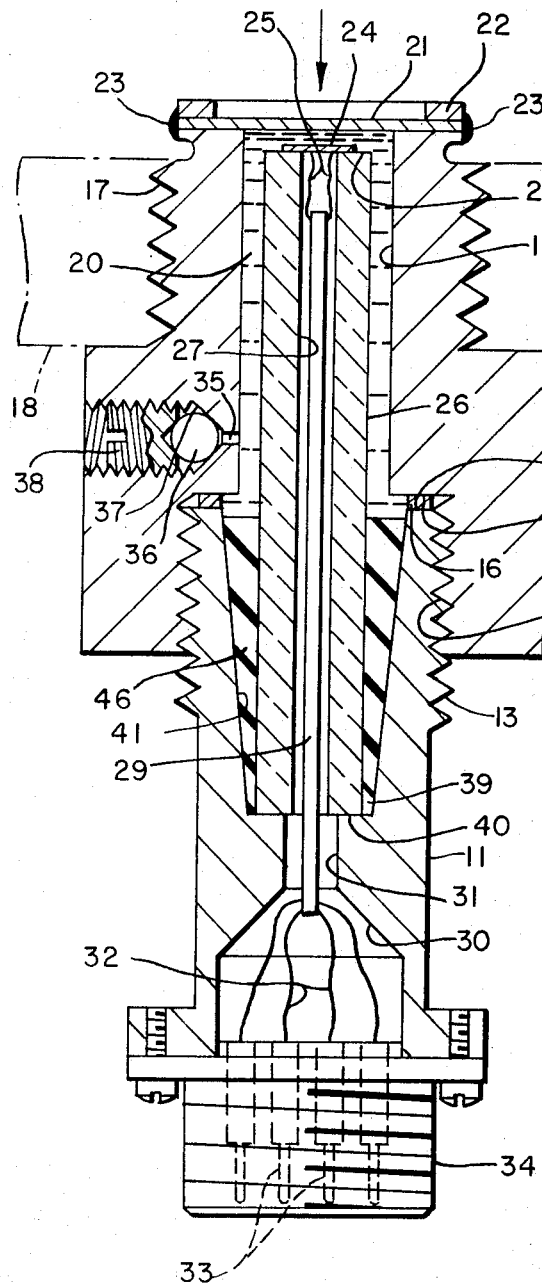
FIG. 1 of the drawing shows a sectional view of a pressure transducer embodying the improved diaphragm assembly mounting and sealing construction in accordance with the invention.

Referring now to the drawing, there is shown a pressure transducer comprising a housing formed of two mating parts 10 and 11 having complementary threaded portions 12 and 13 screwed together in the assembled position shown. To form a tight connection, abutting surfaces 14 and 15 of the mating parts are polished and receive between them a sealing washer 16 of suitable heat-resistant and leakproof material such as graphite.

The upper housing part 10 has a threaded projection 17 by means of which the transducer housing may be screwed into a threaded opening in an enclosure 18 such as a pipe or vessel containing a fluid, the pressure of which is to be measured.

The housing part 10 also has an axial bore 19 forming interior walls defining a fluid chamber 20. The fluid chamber is closed at the top by a flexible isolating diaphragm 21 made of a suitable corrosion resistant material. One such material is an alloy known as Elgiloy consisting of cobalt 40 percent, chromium 20 percent, nickel 15 percent, molybdenum 7 percent, manganese 2 percent, carbon 0.15 percent, beryllium 0.04 percent and the balance iron. The diaphragm is welded to housing part 10 and to a washer 22, the weld area being on the edge of the diaphragm and designated on the drawing by the numeral 23. The washer functions to keep the inner surface of the diaphragm over chamber 20 from being wetted during the welding operation. In use, the diaphragm 21 is subjected to the pressure of the fluid in enclosure 18 which is measured by the transducer.

The transducer uses as a pressure sensor a diaphragm 24 formed of a semiconductor material such as silicon having a central active area on which are formed by solid state diffusion strain-gage resistance elements (not shown). Usually there are four resistance elements located on the diaphragm so that when the diaphragm flexes, two of the elements are in tension and two are in compression. The elements are connected together to form a Wheatstone bridge from which connection wires 25 lead to a resistance measuring circuit (not shown) providing an indication of the pressure applied to the diaphragm. Such pressure measuring diaphragms are known and may, for example, be of the type shown in U.S. Pat. No. 3,537,319 Yerman, granted Nov. 3, 1970, and assigned to the same assignee as the present invention.

The pressure-sensitive diaphragm 24 is mounted on an assembly comprising an elongated support member 26 formed of glass and provided with an axial bore 27. The diaphragm is positioned on one end 28 of the support so that its active area carrying the strain gage elements overlies the bore. The outer restrained edge of the diaphragm is integrally attached to the support end 28 preferably by an anodic bonding process disclosed in U.S. Pat. No. 3,397,278 Pomerantz. To eliminate thermal stresses on the diaphragm caused by differential expansion of the diaphragm and its support, the glass of which the support is made is selected to have a coefficient of expansion approximately the same as that of the silicon diaphragm. One such glass is a borosilicate glass made by Corning Glass Company and identified as Pyrex 7740.

The diaphragm assembly also includes a leadout conductor strip 29 carrying four spaced conductors to which the lead wires 25 are attached. The strip passes into an opening 30 in the lower end of housing part 11 through the bore 27 of support 26 and a central bore 31 in housing. Lead wires 32 extending from the lower end of conductor strip 29 are attached to contact pins 33 of a suitable electrical connector 34 mounted on the bottom of the housing. Connections from the connector (not shown) lead to a resistance measuring circuit by means of which the pressure exerted on diaphragm 24 is measured in a known manner.

In order to transmit to the silicon diaphragm 24 a pressure corresponding to the pressure exerted on the isolating diaphragm 21, the fluid chamber 20 is completely filled with a suitable liquid such as silicone oil. For this purpose, there is provided a passageway 35 leading from outside the housing part 10 to the fluid chamber. It is normally closed by a fill valve comprising a ball 36 in a conical cavity 37 locked in a closed position by a set screw 38. In filling the fluid chamber, the ill valve is opened and the chamber evacuated. The chamber is then allowed to fill with dried and deaerated silicone coil after which the fill valve is closed. For the isolating diaphragm 21 properly to transfer pressure to the silicon diaphragm 24, the fluid chamber 20 must be completely filled with oil to avoid compressability effects. Thus it is very important that the fluid chamber be hermetically sealed so that none of the oil will escape even when subjected to the high operating pressures referred to above.

According to the invention, the diaphragm assembly is mounted in and sealed to the housing part 11 in a manner now to be described which prevents leakage from the fluid chamber and properly positions the part of the assembly that projects into the fluid chamber 20 in the upper housing part 10.

The lower housing part 11 has a socket 39 adapted to receive and support the lower portion of the diaphragm support 26 which rests on a shoulder 40 extending around the top of bore 31. The side walls 41 of the socket are tapered as shown so as to provide a wedge-shaped seal cavity between the walls 41 and the support 26. This cavity is filled with sealant in the following manner.

Figure 2:
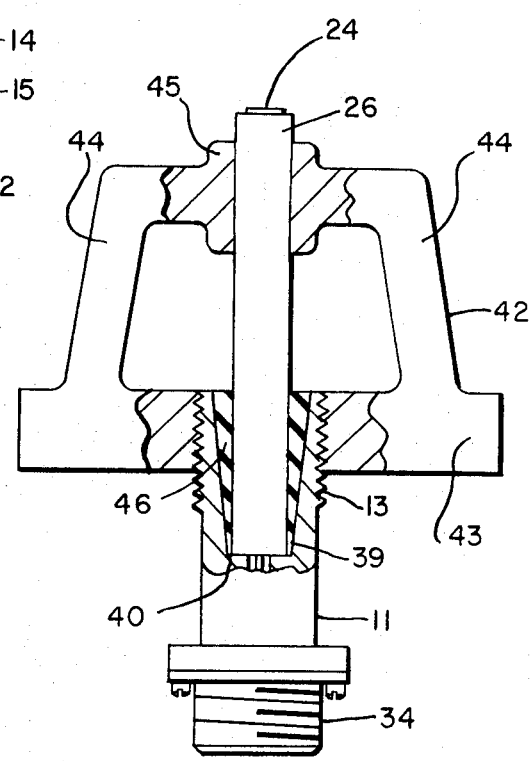
FIG. 2 illustrates a fixture used to position the diaphragm assembly while the seal is being formed.

With the upper housing part 10 and the diaphragm support 26 removed, an alignment fixture, shown in FIG. 2, is screwed onto the threaded portion 13 of lower housing part 11. As shown, the fixture comprises a threaded nut portion 43 from which extend upwardly arms 44 supporting a central collar 45 having an opening dimensioned to receive and accurately position the diaphragm support 26. The support is then inserted with its bottom resting on shoulder 40 and its upper portion supported by collar 45 in a proper position so that when part 10 is assembled, the sides of the support will have the proper clearance with respect to the side walls 19 of fluid chamber 20. In actual practice, this clearance is quite small, being of the order of 0.005 inch in order to minimize the volume of oil in the fluid chamber 20 and thereby reduce any pressure change caused by expansion or contraction of the oil with temperature changes.

With the diaphragm support properly positioned in socket 39 by the fixture 42, the seal cavity is filled by a suitable sealant in liquid form which adheres to walls 41 and the support and hardens to form a wedge-shaped seal 46. The fixture is then removed and the upper housing part 10 assembled so that the parts occupy the position shown in FIG. 1. A sealant found to give good results is a thermosetting epoxy resin which is commercially available from Emerson and Cuming, Inc., Canton, Mass., being sold under the name Eccobond 88. This is a resin filled with inert material so that it has a relatively low coefficient of expansion more nearly approaching the expansion coefficients of the glass support 26 and the stainless steel housing. It also has good adhesive as well as casting properties to aid in forming a tight seal and is not affected by exposure to silicone oil. It is applied in liquid form with adjacent parts preheated to about 125° C. to insure good flow around the parts to be sealed. It is then cured by heating to about 165° C. at which temperature curing and hardening take place.

In use, the fluid pressure in chamber 20 is exerted on the top of the wedge-shaped seal 46 forcing it downwardly into firm contact with the tapered walls 41 and the adjacent walls of the glass support 26. Thus, any tendency for the seal to open up and leak oil due to differential expansion of the glass diaphragm support and the stainless steel housing walls is continuously counteracted by the fluid pressure. Also, since the seal 46 extends completely around the glass support 26, the wedging pressure is uniformly applied around the support over a wide area and thereby avoids stress concentrations that might fracture the glass. Further, a compressive force is applied to the glass which is much stronger in compression than in tension.

It will be understood that in casting the sealant, care is used to avoid filling and plugging the bore 31 which must remain open so that a pressure differential to be measured is exerted across the strain-sensitive diaphragm 24.

While the invention has been illustrated in connection with a sealed, liquid-filled type of pressure transducer, it has application to open types wherein the pressure to be measured is exerted directly against the strain-sensitive diaphragm. In that case, the pressure being measured exerts, directly, the wedging force on the seal 46.

While there has been shown what is presently considered to be a preferred embodiment of the invention, it will be apparent to those skilled in the art that various changes and modifications may be made therein without departing from the spirit and scope of the invention.

What is claimed as new and desired to be secured by Letters Patent of the United States is:

1. A pressure transducer comprising:
   a. a housing having first and second mating parts, the first housing part having interior walls defining a fluid chamber adapted to be subjected to a fluid under pressure and the second housing part having tapered interior walls defining a mounting socket opening into the fluid chamber;
   b. a transducer assembly comprising an elongated support member and a strain-sensitive diaphragm mounted one one end of the support member;
   c. means mounting the transducer assembly on the housing so that the other end of the diaphragm support member is supported in the mounting socket of the second housing part with the side portions adjacent said other end defining with the tapered walls a seal cavity and with the diaphragm end and adjacent side portions projecting into the fluid chamber of the first housing part in spaced relation with the interior walls thereof when the two housing parts are assembled in mating relation; and
   d. a wedge-shaped seal disposed in the seal cavity, said seal being wedged into sealing contact with side walls of the diaphragm support member and the tapered socket walls by the action of pressure in the fluid chamber.

2. The pressure transducer of claim 1 including a flexible isolating diaphragm mounted on the first housing part so as to enclose the fluid chamber, and a fill liquid completely filling the fluid chamber so that pressure exerted on the fill liquid by the isolating diaphragm is transmitted through the liquid to the strain gage diaphragm and to the seal.

3. The pressure transducer of claim 1 wherein the diaphragm support member s formed of glass and the seal is an epoxy resin.

4. The pressure transducer of claim 2 wherein the diaphragm support member is formed of glass, the seal is an epoxy resin and the fill fluid is a silicone oil.

5. The pressure transducer of claim 2 wherein the diaphragm support member has an axial bore forming a passageway leading outside the housing and the diaphragm has an active area which overlies the bore.

6. The pressure transducer of claim 5 wherein the strain-sensitive diaphragm is a piezoresistive type having integral resistance elements connected to electrical conductors extending outside the housing through the axial bore.

* * * * *